Feb. 6, 1951

G. C. SPILLMAN ET AL 2,540,840

STRAND GUIDING APPARATUS

Filed Oct. 8, 1949

INVENTORS
G.C. SPILLMAN
N. ZUCK

BY W.C. Parnell

ATTORNEY

Feb. 6, 1951

G. C. SPILLMAN ET AL 2,540,840

STRAND GUIDING APPARATUS

Filed Oct. 8, 1949

INVENTORS
G.C. SPILLMAN
N. ZUCK

BY
W.C. Parnell
ATTORNEY

Feb. 6, 1951 G. C. SPILLMAN ET AL 2,540,840
STRAND GUIDING APPARATUS
Filed Oct. 8, 1949 3 Sheets-Sheet 3
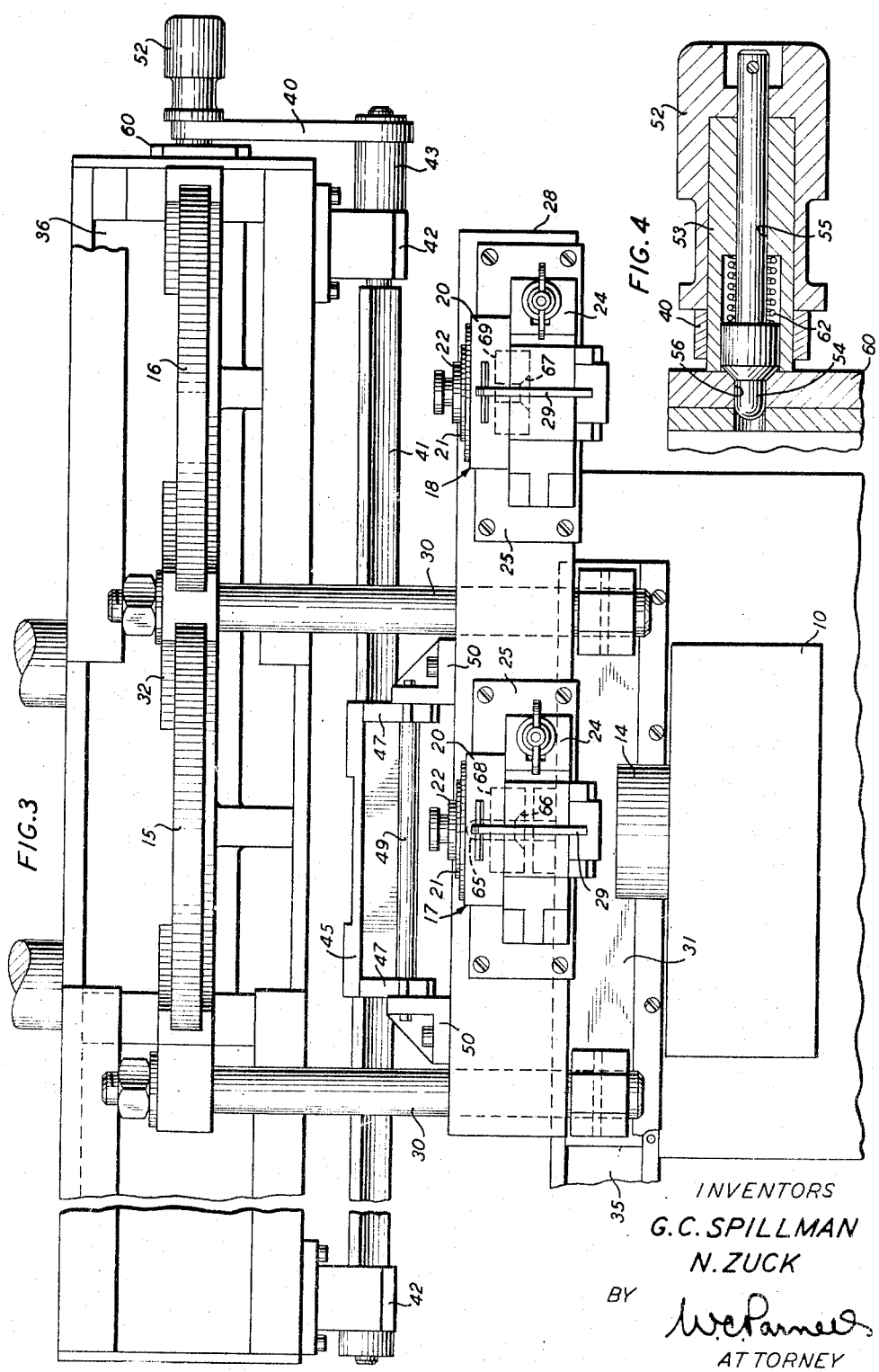
INVENTORS
G.C. SPILLMAN
N. ZUCK
BY
W.C. Parnell
ATTORNEY Patented Feb. 6, 1951

2,540,840

UNITED STATES PATENT OFFICE 2,540,840

STRAND GUIDING APPARATUS

Gordon C. Spillman, Roselle, N. J., and Nicholas Zuck, Brooklyn, N. Y., assignors to Western Electric Company, Incorporated, New York, N. Y., a corporation of New York Application October 8, 1949, Serial No. 120,342

7 Claims. (Cl. 57—1)

This invention relates to strand guiding apparatus for particular use in stranding machines where insulated wires are formed into cable units.

Cable units for use in the communication art are formed of a plurality of insulated electrical conductors fed in single strands or in pairs from supply reels through a strand guiding unit and into the entrance end of the strander after which the wires are twisted spirally to form a compact unit. In preparing to make a cable, considerable time is required in threading the first group of wires through the apertures in the conventional guide plate, the strand guiding unit and the strander. While the other groups may be tied to the first for threading through the strander, they first must be threaded individually through the guide plate and unit and these operations cause further loss of operating time.

The principal object of this invention is to reduce the time a stranding machine must remain idle during such setup operations.

With this and other objects in view, a strand guiding apparatus is provided with two or more sets of strand guides so that while the strander is operating, other groups of strands may be threaded through one set of strand guides in the loading position in preparation for stranding the next length of cable. More specifically the invention comprises a strand guiding apparatus for a stranding machine having an apertured member to receive a plurality of strands, the apparatus including strand guiding units having passageways for the strands to be guided from groups of supplies, the units being mounted at spaced positions on a carriage movable relative to the apertured member whereby one of the units is in a loading position to receive strands from one group of supplies, while the strands from another group of supplies are being guided through the unit at the operating position.

The carriage is movably disposed on parallel rods in a path parallel with the centerline of the apertured member and the path of the strands moving through the strander, while the rods are supported at their ends by slides to permit longitudinal movement of the carriage to alternately locate the strand guiding units in the operating and loading positions. A hand lever is actuable to move the carriage with the units on the parallel rods into anyone of three positions, the first position freeing the carriage for movement on its slides; the second position locking the carriage with either unit in the operating position, and an intermediate position for the hand lever locating the carriage a distance away from the apertured member, yet locked against longitudinal movement when it is necessary to open the unit for splicing a strand which has become broken or for tying a subsequent group of strands to a preceding group.

Other objects and advantages will be apparent from the following description, when considered in conjunction with the accompanying drawings, wherein Fig. 1 is a side elevational view of the strand guiding apparatus shown in combination with a strander, the carriage being disposed in a locked position;

Fig. 3 is a fragmentary top plan view of the strand guiding apparatus, and

Fig. 4 is an enlarged fragmentary sectional view taken along the line 4—4 of Fig. 1.

Figure 1:
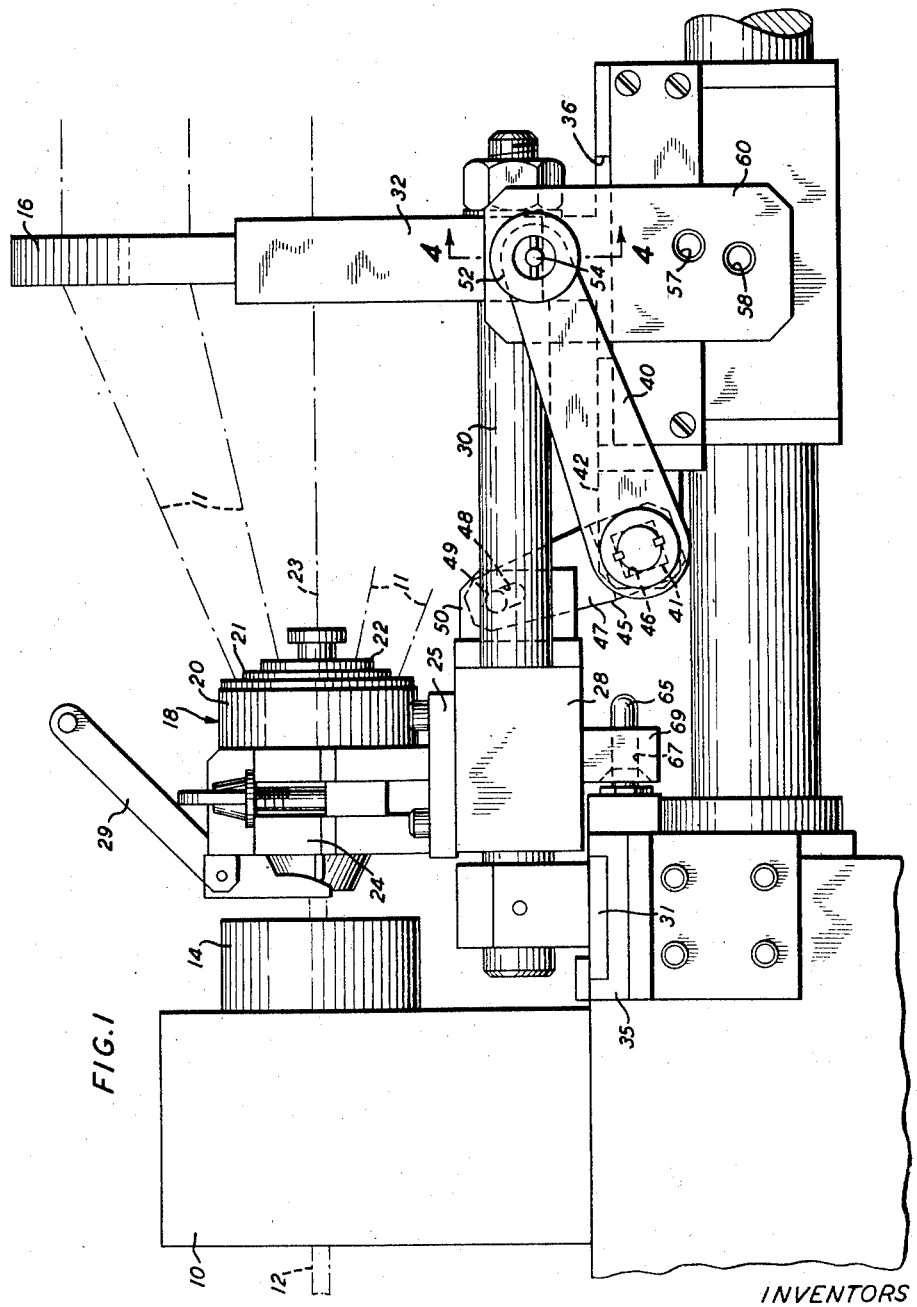

The strand guiding apparatus as disclosed in the drawings is in the present embodiment employed in combination with a strander 10 capable of receiving a plurality of strands 11, such as insulated wires, and twist them spirally into a single cable unit 12. The strander 10 has an apertured member 14 which is to receive the strands 11 after they pass through one of the guiding plates 15 or 16 and the associated strand guiding unit 17 or 18.

The plates 15 and 16 are circular in general contour and are provided with spaced apertures providing individual passageways for the strands 11 located uniformly within the plates so that the strands may be advanced in their proper order to their unit 17—18. The strand guiding units 17 and 18 are identical in structure and are the subject matter of a copending application of S. Pitt-G. C. Spillman-L. G. Wade, Serial No. 114,624, filed September 8, 1949. Each strand guiding unit includes an outer casing 20, having a conical aperture therein to receive an intermediate member 21, conical in general contour and provided with fins to divide the space between the member and the casing into individual passageways for the strands 11. An inner member 22 is conical in general contour having fins on its outer surface to divide the space between the inner member and the intermediate member into individual passageways, the inner member also having a central passageway for a core strand 23. Through the aid of clamps 24 and supporting brackets 25, the casings 20 for the units 17 and 18 are rigidly mounted at spaced positions on a carriage 28 while a hand lever 29 for each unit is actuable to cause movement of the inner member 22 and the intermediate member 21 relative to each other and also relative to the casing 20 to open the pasageways in each unit for the feeding of knots therethrough resulting from the splicing of broken strands or the tying in of a new group of strands.

The carriage 28 is supported for movement in a plane, parallel with the aperture in the member 14, on parallel rods 30 which have their ends supported by a slide 31 and a frame-like slide 32. The frame-like slide 32 is of a contour to removably support the guide plates 15 and 16 in their respective positions in alignment with their respective units 17 and 18. The slide 31 is positioned for movement in a given path on a guideway or track 35, a similar track or guideway 36 being provided for the frame-like slide 32. It will therefore be apparent that the carriage 28 with the units 17 and 18 may be moved in either direction relative to the apertured member 14, the lateral movement on the rods 30 being toward or away from the member 14 in a plane parallel with its axis, while the movement on the slides 31 and 32 while supporting the carriage, will enable movement of the units between their loading positions away from the member 14 and their guiding or operating positions in alignment with the member.

A hand lever 40 is mounted on a shaft 41 which is square for the major portion of its length except where it is journalled in bearings 42 and secured to the hand lever 40 at 43. A yoke 45 U-shaped in general contour has a square aperture 46 in its central portion through which the square portion of the shaft 41 extends to enable longitudinal movement of the yoke on the shaft and maintain a positive connection between the yoke and the shaft at all times. The upwardly extending arms 47 of the yoke 45 have elongate apertures 48 therein through which a pin 49 extends. The ends of the pin 49 are supported by brackets 50 mounted on the carriage 28 completing the operative connection between the hand lever 40 and the carriage to bring about lateral movement of the carriage during actuation of the hand lever.

A handle 52 for the hand lever 40 is movably supported on a projection 53 and carries a plunger 54 slidable in a longitudinal aperture 55 of the projection to enter apertures 56, 57 or 58 in a bracket 60 mounted at a fixed position at the adjacent end of the track 36. A spring 62 normally urges the plunger 54 inwardly to hold the plunger in anyone of the apertures 56, 57 or 58 to maintain the carriage 28 with its guiding units in anyone of the various positions relative to the apertured members 14. A locking pin 65 is mounted on one side of the track or guideway 35 to enter either aperture 66 or 67 in brackets 68 and 69 mounted on the carriage directly beneath their respective units 17 and 18 and in central alignment therewith to accurately position and lock the carriage with their respective units in central alignment with the apertured member 14.

Figure 2:
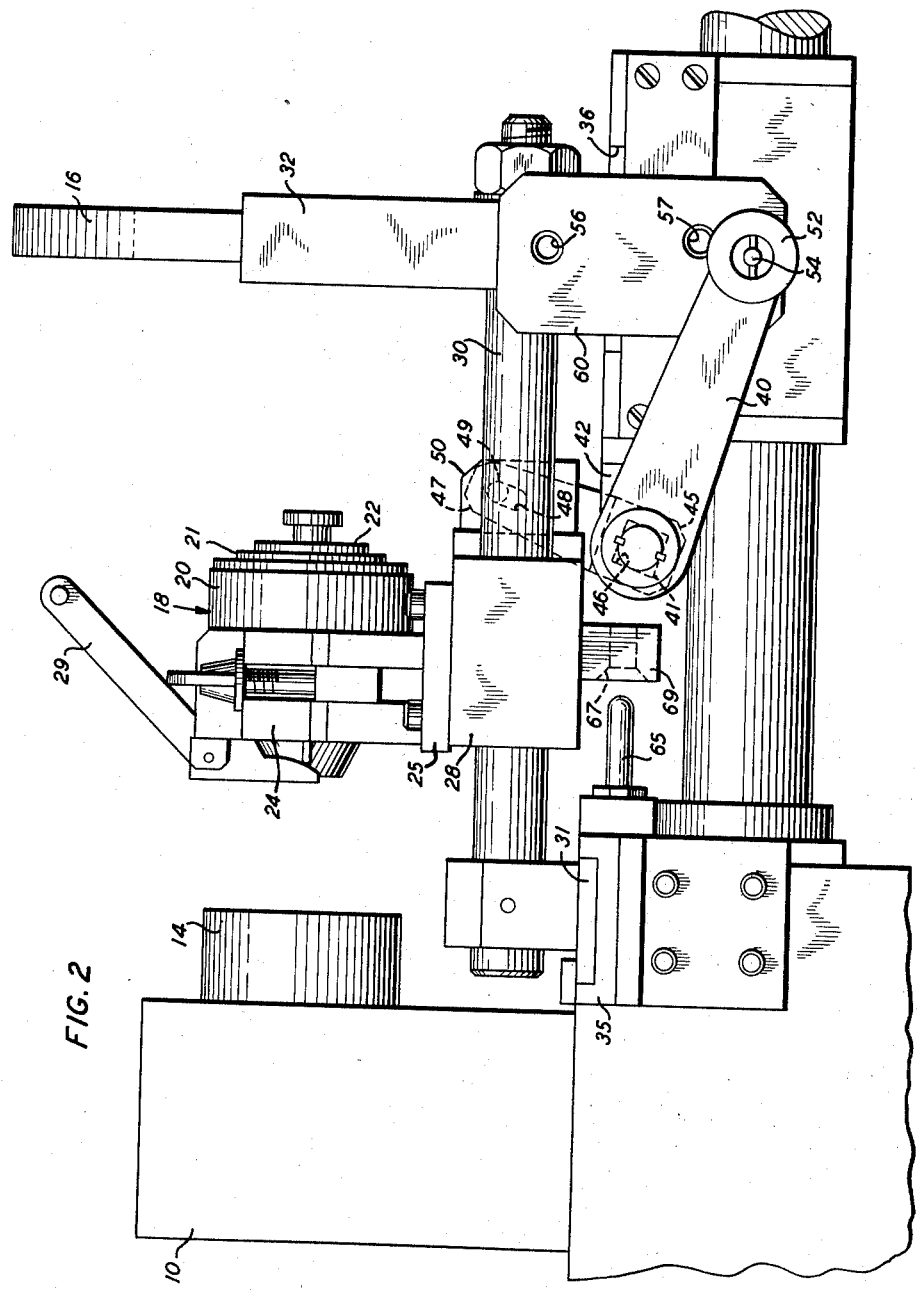
Fig. 2 is substantially the same as Fig. 1 with the exception that the carriage with the units have been moved out of locked position.

Considering now the operation of the apparatus, let it be assumed that the apparatus is in the position shown in Figs. 1 and 3 with the strander 10 in operation pulling the strands from their supplies through the apertures in the guide plate 15 and the individual passageways in the unit 17 after which the strands are spirally twisted together to form a cable unit in the strander. While this is taking place, the unit 18 with its guiding plate 16 are located at a loading position whereby the operator may readily thread strands from another group of supplies through the apertures in the guide plate 16 and the individual passageways in the strand guiding unit 18. When the strands from the first supply are exhausted, the operator may pull outwardly upon the handle 52 releasing the plunger 54 from the aperture 56 and rock the handle about the axis of the shaft 41 until the plunger 54 is free to enter the aperture 58. During this movement, the carriage is unlocked from the pin 65 as shown in Fig. 2 and is free to move longitudinally to move the unit 17 and the guide plate 15 into their loading positions and at the same time move the threaded guide plate 16 and unit 18 into the operating position. At this time, the operator releases the plunger 54 from the aperture 58 and moves the hand lever 40 until the plunger is aligned with the aperture 57 at which time the handle 52 is released. During this actuation of the apparatus, the carriage has been moved laterally a distance sufficient to cause the pin 65 to be positioned in the aperture 67, locking the carriage against movement in either direction and positioning the unit 18 a distance from the apertured member 14 sufficient for the tying in of the leading ends of the new strands with the tail ends of the first strands. When this has been accomplished, the operator frees the plunger 54 from the aperture 57 and moves the hand lever 40 upwardly until the plunger registers with the aperture 56. The carriage is then moved toward the member 14 of the strander where the strands will be guided into the strander during the forming of the cable unit. Should any of the strands break during the operation of the strander, the carriage may be moved a given distance away from the strander to allow space between the unit and the strander for the splicing of the broken strand by moving the hand lever away from the position shown in Fig. 1 to a position where the plunger 54 registers with the aperture 57. At this time, the unit 17 or 18 at the operating position may be opened through the actuation of the handle 29 and after the broken strand has been spliced, the unit may again be closed and the apparatus returned to the operating position by moving the hand lever 40 upwardly until the plunger registers with the aperture 56.

While the strands are being advanced through the guide plate 16 and the unit 18, strands from another group of supplies may be threaded through the guide plate 15 and the strand guiding unit 17 to be in readiness for connection with the trailing ends of the strands now being fed through the apparatus and machine. With this apparatus, the time required for the threading of a group of strands through the guide plates and the strand guiding units may take place during the operation of the strander in processing another group of strands, requiring the strander to be idle only during the tying-in process when the leading ends of a new supply of strands are tied to the trailing ends of the former supply.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A strand guiding apparatus for a stranding machine having an apertured member to receive a plurality of strands, the apparatus comprising strand guiding units having passageways for strands to be guided from a group of supplies therefor toward the apertured member when the units are disposed singly in an operating position in alignment with the apertured member, a carriage mounted for movement relative to the apertured member, means to mount the units at spaced positions on the carriage whereby one of the units is in a loading position to receive strands from one group of supplies while the strands from the other group of supplies are being guided through the unit at the operating position, and means actuable to move the carriage.

2. A strand guiding apparatus for a stranding machine having an apertured member to receive a plurality of strands, the apparatus comprising strand guiding units having passageways for strands to be guided from a group of supplies therefor toward the apertured member when the units are disposed singly in an operating position in alignment with the apertured member, a carriage mounted for movement relative to the apertured member, means to mount the units at spaced positions on the carriage whereby one of the units is in a loading position to receive strands from one group of supplies while the strands from the other group of supplies are being guided through the unit at the operating position, means actuable to move the carriage, and means to lock the carriage against movement with either unit in the operating position.

3. A strand guiding apparatus for a stranding machine having an apertured member to receive a plurality of strands, the apparatus comprising strand guiding units having passageways for strands to be guided from a group of supplies therefor toward the apertured member when the units are disposed singly in an operating position in alignment with the apertured member, a carriage with means to support the units at spaced positions thereon, an element to support the carriage for movement in a given path to move the unit in the operating position toward or away from the apertured member, and means to support the element for movement thereof with the carriage and units at an angle relative to the said given path to alternately move the units into the operating position from loading positions where strands from another group of supplies may be threaded through the passageways in the unit.

4. A strand guiding apparatus for a stranding machine having an apertured member to receive a plurality of strands, the apparatus comprising strand guiding units having passageways for strands to be guided from a group of supplies therefor toward the apertured member when the units are disposed singly in an operating position in alignment with the apertured member, a carriage with means to support the units at spaced positions thereon, an element to support the carriage for movement in a given path to move the unit in the operating position toward or away from the apertured member, means to support the element for movement thereof with the carriage and units at an angle relative to the said given path to alternately move the units into the operating position from loading positions where strands from another group of supplies may be threaded through the passageways in the unit, a locking element mounted at a fixed position adjacent the operating position, and locking members mounted on the carriage adjacent their respective units to cooperate with the locking element to singly lock the carriage with their respective units in the operating position.

5. A strand guiding apparatus for a stranding machine having an apertured member to receive a plurality of strands, the apparatus comprising strand guiding units having passageways for strands to be guided from a group of supplies therefor toward the apertured member when the units are disposed singly in an operating position in alignment with the apertured member, a carriage with means to support the units at spaced positions thereon, an element to support the carriage for movement in a given path to move the unit in the operating position toward or away from the apertured member, means to support the element for movement thereof with the carriage and units at an angle relative to the said given path to alternately move the units into the operating position from loading positions where strands from another group of supplies may be threaded through the passageways in the unit, a locking element mounted at a fixed position adjacent the operating position, locking members mounted on the carriage adjacent their respective units to cooperate with the locking element to singly lock the carriage with their respective units in the operating position, a mechanism actuable into a plurality of positions, one to unlock the carriage for movement between the loading positions and the operating position, another to lock the carriage with either unit in the operating position and another to maintain the carriage locked in either operating position, but spaced from the apertured member.

6. A strand guiding apparatus comprising a carriage, strand guiding units mounted at spaced positions on the carriage and having passageways for a group of strands, means to support the carriage for movement with the units between an operating position for the units singly and loading positions therefor, and means to lock the carriage in these positions.

7. A strand guiding apparatus comprising a carriage, strand guiding units mounted at spaced positions on the carriage and having passageways for a group of strands, means to support the carriage for movement with the units between an operating position, a strand tying position and loading positions for the units, and means to lock the carriage with the units in these positions.

GORDON C. SPILLMAN.
NICHOLAS ZUCK.

No references cited.